United States Patent [19]
Igashira et al.

[11] 4,325,344
[45] Apr. 20, 1982

[54] FUEL EVAPORATOR

[75] Inventors: Toshihiko Igashira, Toyokawa; Naoki Umeda, Nagoya; Seiko Abe, Kariya, all of Japan

[73] Assignee: Nippon Soken, Inc., Nishio, Japan

[21] Appl. No.: 155,014

[22] Filed: May 30, 1980

[30] Foreign Application Priority Data

Jun. 5, 1979 [JP] Japan ............................ 54-70287
Jun. 8, 1979 [JP] Japan ............................ 54-72477
Apr. 28, 1980 [JP] Japan ............................ 55-56822

[51] Int. Cl.³ .......................................... F02M 31/00
[52] U.S. Cl. .................................. 123/549; 123/552; 123/548; 261/142
[58] Field of Search ...................... 123/549, 552, 548; 219/206, 207, 307, 374, 375, 376, 381, 382, 505; 261/142

[56] References Cited

U.S. PATENT DOCUMENTS

| | | | |
|---|---|---|---|
| 2,139,777 | 12/1938 | Skok | 123/549 |
| 2,142,210 | 1/1939 | Rippingille | 123/549 |
| 3,987,772 | 10/1976 | McBride | 123/549 |
| 4,141,327 | 2/1979 | Marcoux | 123/549 |
| 4,177,778 | 12/1979 | Naitou | 123/549 |
| 4,242,999 | 1/1981 | Hoser | 123/549 |

FOREIGN PATENT DOCUMENTS 2434275 4/1980 France .................... 123/549

*Primary Examiner*—Ronald H. Lazarus
*Attorney, Agent, or Firm*—Cushman, Darby & Cushman

[57] ABSTRACT

A fuel evaporator for use in a fuel entry system of an internal combustion engine comprises a heating element of ceramics having a positive temperature coefficient of resistance, a thermally conductive covering plate which covers the heating element in the fuel entry system and a connecting means which electrically connects the heating element to an electric power source.

The connecting means comprises two electrifying routes and switching means which breaks one electrifying route or selectively connects the two electrifying routes in parallel or in series in accordance with the driving condition of the engine.

The fuel droplets falling within the fuel entry system can be evaporated by only a small amount of electric power with high efficiency.

And by controlling the electric power consumed by the fuel evaporator, the starting condition of the engine can be maintained good.

10 Claims, 7 Drawing Figures

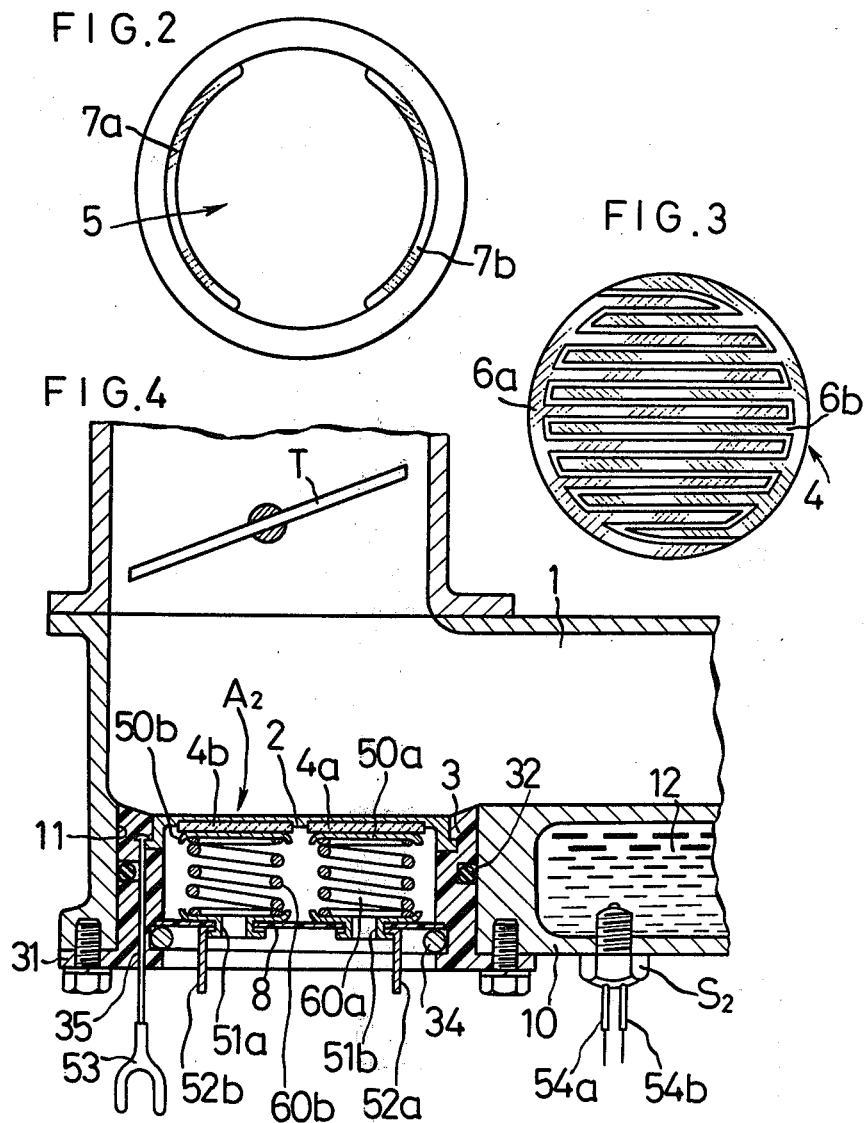

FUEL EVAPORATOR

BACKGROUND OF THE PRESENT INVENTION

The present invention relates to a fuel evaporator for use in a fuel entry system of an internal combustion engine.

Ceramics containing barium titanate as a main ingredient, for example, have a positive temperature coefficient of resistance and the resistance thereof is suddenly increased at a specific temperature. The temperature at which the electric resistance of the ceramics is suddenly increased (that is Curie temperature) is ranged from 120° C. to 150° C. due to the difference of the material of the ceramics. Under the Curie temperature, a large amount of electric current flows. And the temperature of the ceramics rises up to the Curie temperature rapidly. Then, over the Curie temperature, the electric resistance is remarkably increased so that only a small amount of electric current flows. Thus, the ceramics keep the temperature thereof at about the Curie temperature thereof.

A heater using the above described ceramics (PTC heater) can be applied to an internal combustion engine as a fuel evaporator for heating and evaporating fuel droplets.

Conventionally, engine cooling water and exhaust gas have been employed to heat and evaporate the fuel droplets.

However, at a cold starting time of the engine, the temperature thereof does not rise rapidly so that the fuel droplets were not heated nor evaporated sufficiently.

In contrast, PTC heater reaches the Curie temperature instantly when electrified. Therefore, PTC heater is preferable as a fuel evaporator of the engine.

However, there is a problem when the PTC heater is used as the fuel evaporator. Namely, the PTC heater consumes considerably large amount of electric power so that the voltage of the battery drops to lower the capacity of other electric apparatus connected thereto.

In particular, at an engine starting time, the electric power required to operate a starting motor cannot be sufficiently obtained so that the starting condition of the engine is not good.

Accordingly, one object of the present invention is to provide a fuel evaporator having a PTC heater, which can evaporate fuel droplets within a fuel entry system by only a small amount of electric power with high efficiency.

Another object of the present invention is to provide a fuel evaporator having a PTC heater which controls the electric current in response to the driving condition of the engine.

Still another object of the present invention is to provide a fuel evaporator having a PTC heater, which does not prevent the engine from starting in a good condition.

DESCRIPTION OF THE DRAWINGS

Other objects and advantages of the invention will become apparent from the following description of embodiments with reference to the accompanying drawings wherein:

FIG. 2 is a top view of an electrode supporting plate;

FIG. 3 is a bottom view of a heating element which is opposed to the electrode supporting plate;

FIG. 4 is a longitudinal sectional view of a fuel evaporator of a second embodiment of the present invention.

DETAILED DESCRIPTION OF THE PRESENT INVENTION

The fuel evaporator of the present invention comprises a PTC heating element, a covering plate which covers the PTC heating element and is heated due to the heat transmitted from the heating element and a connecting means for electrically connecting the heating element to an electric power source.

The connecting means is composed of two electrifying routes and a switching means which interrupts one electrifying route or selectively connects the two electrifying routes in parallel or in series, corresponding to the driving condition of the engine.

Figure 1:
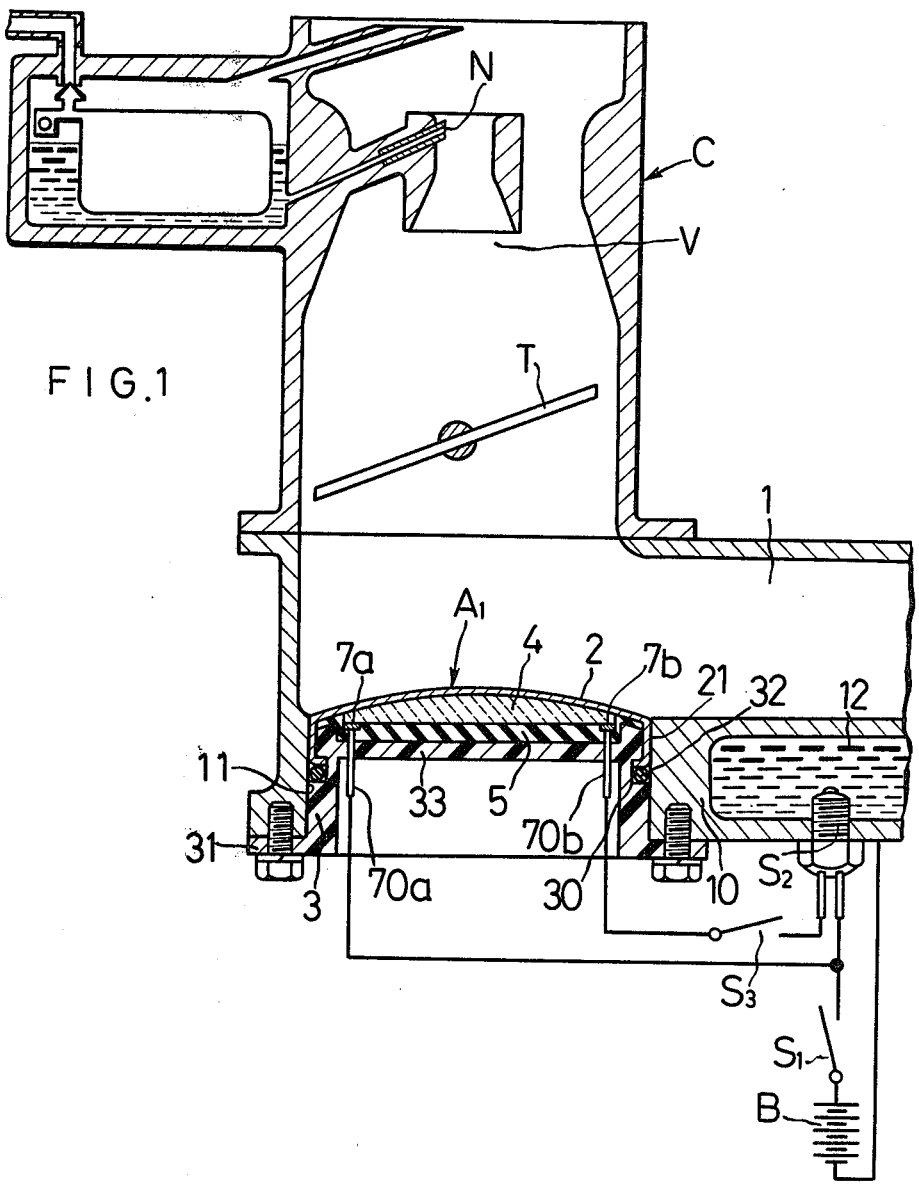
FIG. 1 is a longitudinal sectional view of a fuel evaporator of a first embodiment of the present invention.

Hereinafter, the present invention will be explained according to embodiments with reference to the drawings. FIG. 1 to FIG. 3 show a first embodiment of the present invention.

In the upper stream of an intake manifold 1 of an internal combustion engine, a carburater C is provided. The fuel is supplied from a fuel supply nozzle N of a fuel supplying device which opens in a venturi portion V of the carbureter C. Then, the supplied fuel is mixed with an intake air and is supplied to a combustion chamber (not shown) of the engine through a throttle valve T and the intake manifold 1.

In a bent portion of the intake manifold 1, a circular hole 11 is perforated in a wall 10 of the intake manifold 1 so as to open directly under a throttle valve T. And a fuel evaporator $A_1$ is disposed in the hole 11.

In the wall 10 of the downstream of the fuel evaporator $A_1$, a water jacket 12 is perforated for circulating the engine cooling water.

In the opening of the circular hole 11 of the wall 10, a covering plate 2 which is made of thermally conductive metal such as aluminium is plugged from the intake manifold 1. The covering plate 2 shapes a spherical surface which projects into the intake manifold 1 and which is connected with the wall surface 10 continuously.

Within a hole 11, a cylindrical supporting member 3 which is made of heat resistant and insulated synthetic resin is inserted fitly for supporting the covering plate 2. The supporting member 3 is fixed to the wall 10 by bolt means in the flange portion 31 thereof which is formed in the lower open end thereof.

Within a groove 30 which is perforated in the outer peripheral surface of the supporting member 3 in a circumferential direction thereof, O ring is inserted fitly for sealing the space between the supporting member 3 and the wall 10.

In the upper portion of the supporting member 3, a supporting plate 33 is integrally formed. Between the covering plate 2 and the supporting plate 33, a heating element 4 and an electrode supporting plate 5 are interposed fixedly.

The heating element 4 is made of a sintered body mainly composed of barium titanate and has a positive temperature coefficient of resistance. And the heating element 4 generates heat at the Curie temperature when electrified. The heating element 4 is formed so that the upper surface thereof has the shape corresponding to the covering plate 2. In the upper surface of the heating element 4, silver paste as an electrode material obtained by mixing silver powder with epoxy resin, is plated to form an electrode surface.

As shown in FIG. 3, the lower surface of the heating element 4 is composed of a pair of arc-shaped portions and a plurality of linearly elongating portions which alternately project from the arc-shaped portions in the opposed directions with each other. Electrode material is also plated on these portions to form an electrode surface 6a of a first electrifying route and an electrode surface 6b of a second electrifying route which are not contacted with each other.

Between the lower surface having the above described structure and the supporting plate 33 of the supporting member 3, an electrode supporting plate 5 made of silicon rubber is interposed.

As shown in FIG. 2, in the outer peripheral portion of the upper surface of the electrode supporting plate 5, an arc-shaped first electrode 7a and an arc-shaped second electrode 7b each of which is made of copper are embedded so as to slightly project from the upper surface of the electrode supporting plate 5 inwardly.

And the first electrode 7a is opposed to the electrode surface 6a and contacted therewith. And the second electrode 7b is opposed to the electrode surface 6b and contacted therewith under pressure.

From these electrodes 7a and 7b, electrode terminals 70a and 70b project downward, respectively, penetrating the electrode supporting plate 5 and the supporting plate 33 of the supporting member 3, respectively. And the first electrode terminal 70a is connected to a positive electrode terminal of a battery B through an ignition switch $S_1$ while the second electrode terminal 70b is connected to the positive electrode terminal of the battery B through a coolant thermal switch $S_2$, an engine switch $S_3$ and the ignition switch $S_1$ in series.

The coolant thermal switch $S_2$ is provided in the water jacket 12 and is connected to a water temperature detector (not shown). When the temperature of the cooling water rises up to a predetermined temperature, for example, 60° C., the coolant thermal switch $S_2$ is opened and when the temperature of the cooling water is under the predetermined temperature, the coolant thermal switch $S_2$ is closed.

The engine speed switch $S_3$ is connected to an engine speed detector (not shown). The engine speed switch $S_3$ is opened under a predetermined engine speed, for example, 400 rpm and is closed over the predetermined engine speed.

And the negative electrode terminal of the battery B is connected to the electrode surface formed in the upper surface of the heating element 4 through the wall 10.

When the ignition switch $S_1$ is closed to start an engine, electric current flows from the battery B into the heating element 4 through the first electrifying route including the electric terminal 70a and the first electrode 7a. At this time, the temperature of the cooling water within the water jacket 12 is below 60° C. and the coolant thermal switch $S_2$ is closed.

The engine speed switch $S_3$ is firstly opened for a very short period of time and is closed when the engine speed is over the engine cranking speed (under 400 rpm). And the electric current flows from the battery B into the heating element 4 through the second electrifying route including the coolant thermal switch $S_2$, the engine speed switch $S_3$, the second electrode terminal 70b and the second electrode 7b. As a result, the heating element 4 receives a large amount of electric current from the battery B through the first and second electrifying routes to generate heat to reach a Curie temperature (for example, 120° C.) within one or two seconds. And the heat of the heating element 4 is transmitted to the covering plate 2, immediately.

Fuel droplets which are dropped on the heating plate 2 are evaporated and then sucked into an engine combustion chamber together with the intake air.

In several minutes after the engine was started, the temperature of the cooling water rises up over 60° C. and the coolant thermal switch $S_2$, is opened. The second electrifying route is broken.

As a result, the electrified surface area of the heating element 4 is reduced to half and the electric current is also reduced to half so that the consumed electric power can be saved. And the temperature of the heating element 4 to which the electric power is applied only through the first electrifying route is kept at about 60° C. to 80° C.

At this time, the temperature of the wall 10 of the intake manifold 1 rises up to such a temperature as to evaporate the fuel droplets by means of the engine cooling water.

As described above, according to the fuel evaporator of the first embodiment, fuel droplets can be effectively evaporated at an engine starting time by heating the heating element 4 rapidly. And by controlling the electric power which is consumed in the heating element 4 at an engine cranking time, the starting condition of the engine can be maintained good.

Furthermore, by controlling the electric power which is consumed in the heating element 4 when the temperature of the engine cooling water rises up to such a temperature as to evaporate fuel droplets thereby, the electric power can be saved.

And as shown in the above described embodiment, by forming the covering plate 2 into a curved surface, the surface area thereof becomes larger so that the fuel evaporator efficiency can be improved. And the stress applying to the covering plate 2 due to the intake negative pressure can be decreased to prevent the covering plate 2 from deforming thereby.

Figure 5:
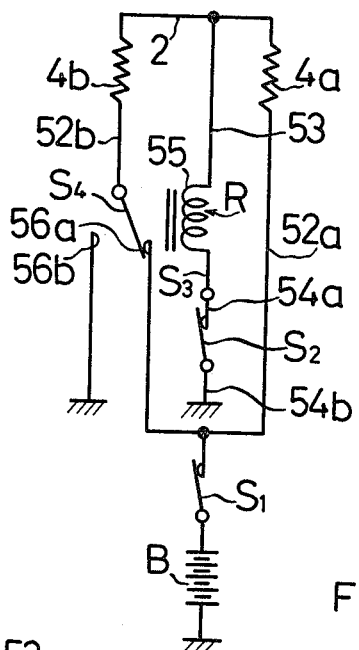
FIGS. 5, 6 and 7 are electric circuits of the fuel evaporators of the present invention.

FIG. 4 and FIG. 5 show a second embodiment of the present invention.

A fuel evaporator $A_2$ is inserted in the hole 11 perforated in the wall 10 of the intake manifold 1. In the hole 11, a cylindrical supporting member 3 made of insulated synthetic resin is closely inserted. The supporting member 3 is fixed to the wall surface 10 by bolt means through a flange portion 31 which is formed in the lower open end thereof. And between the supporting member 3 and the hole 11, O ring 32 is inserted for sealing therebetween. The upper open end of the supporting member 3 is closely covered by a covering plate 2 made of a thin aluminium plate. And the wall surface 10, the upper surface of the supporting member 3 and the covering plate 2 form a continuous surface.

In the reverse side of the covering plate 2, two sheets of semi-circular heating elements 4a and 4b which are formed by sintering the material containing barium titanate as a main ingredient, are disposed so that the diameter portions thereof are opposed to each other at a predetermined interval.

To the lower surfaces of the heating elements 4a and 4b, spring holders 50a and 50b made of copper plates are adhered. Each of the heating elements 4a and 4b is pressed upwardly to the reverse surface of the covering plate 2 by means of each of springs 60a and 60b through each of the spring holders 50a and 50b, individually.

A bottom plate 8 made of synthetic resin is fixed to the lower open end of the supporting member 3 by a circular clip 34.

The springs 60a and 60b are supported by spring holders 51a and 51b made of copper plates which are fixed to the bottom plate 8 so as not to be contacted with each other.

To the lower surface of the bottom plate 8, electrode terminals 52a and 52b made of copper are fixed by the spring holder 51a and 51b, respectively.

In a hole 35 perforated in the supporting member 3, an electrode terminal 53 made of copper is inserted. One end of the electrode terminal 53 is contacted with the covering plate 2.

In the wall 10 of the intake manifold 1, a water jacket 12 is provided for circulating engine cooling water, near the fuel evaporator $A_2$. And in the wall 10, a coolant thermal switch $S_2$ which operates in the same manner as described in the first embodiment is provided. And from the coolant thermal switch $S_2$, electrode terminals 54a and 54b are extended.

The electric circuit for applying electric current to the fuel evaporator $A_2$ is shown in FIG. 5. Negative electrode surface which is formed on each of the two heating elements 4a and 4b is contacted with a covering plate 2 and connected to the electrode terminal 53. The electrode terminal 53 is connected to one electrode terminal 54a of the coolant thermal switch $S_2$ through a coil 55 of a relay means R, an engine speed switch $S_3$ similar to that of the first embodiment. The other electrode terminal 54b of the coolant thermal switch $S_2$ is grounded.

A positive electrode terminal 52a of the heating element 4a is connected to a battery B through an ignition switch $S_1$. A positive electrode terminal 52b of the heating element 4b is connected to a switch $S_4$ of a relay means R. A make contact 56a of the switch $S_4$ is connected to the electrode terminal 52a and a brake contact 56b thereof is connected to a ground terminal.

Hereinafter, the operation of the fuel evaporator $A_2$ will be explained.

When the engine is started by closing the ignition switch $S_1$ and the engine speed is increased over 400 rpm, the coolant thermal switch $S_2$ and the engine speed switch $S_3$ are closed, and the electric current flows into the heating element 4a from the battery B through the terminal 52a. Then the electric current flows back into the ground electrode of the battery B through the covering plate 2, the electrode terminal 53, the relay coil 55, the engine speed switch $S_3$ and the coolant thermal switch $S_2$. At this time, the switch $S_4$ of the relay means R is closed. Therefore, the electric current applied from the battery B flows back into the grounded electrode of the battery B through the make point 56a, the electrode terminal 52b, the heating element 4b, the covering plate 2, the electrode terminal 53 and the coolant thermal switch $S_2$.

As a result, to the heating elements 4a and 4b, the electric voltage is applied in parallel so that a large amount of electric current is transmitted to the heating elements 4a and 4b. The covering plate 2 is heated rapidly up to about the Curie temperature of the heating elements 4a and 4b. Consequently, fuel droplets are evaporated upon contacting with the covering plate 2.

When the temperature of the engine cooling water rises up over 60° C., the coolant thermal switch $S_2$ is opened. At this time, the coil 55 of the relay means R is not electrified so that the brake contact 56b of the relay means R is closed.

As a result, to the heating elements 4a and 4b, the electric voltage is applied in series so that the electric resistance is increased to prevent the amount of the electric current from increasing. Therefore, the temperature of the covering plate 2 is kept at about 50° C. to 70° C.

Figure 6:
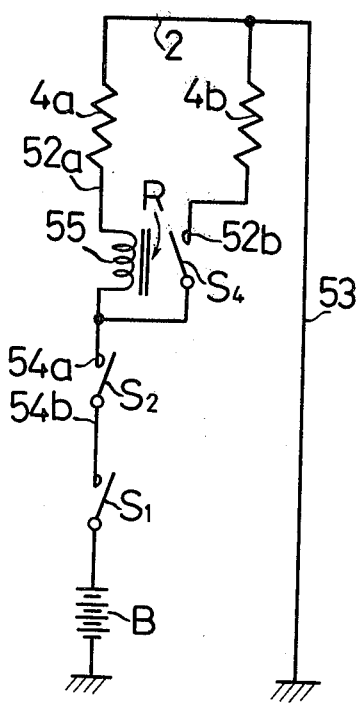
Figure 7:
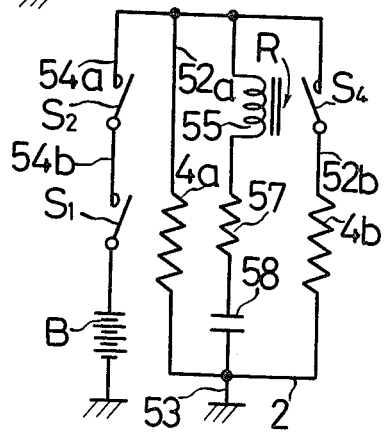

In the electric circuit as shown in FIG. 6 and FIG. 7, the same operation effect as described above can be obtained.

The positive electrode terminal 52a of the heating element 4a is connected to the battery B through the coil 55 of the relay means R, the coolant thermal switch $S_2$, and the ignition switch $S_1$.

And the positive electrode terminal 52b of the heating element 4b is connected to the terminal 54a of the coolant thermal switch $S_2$ through the switch $S_4$ of the relay means R. The relay means R operates to open the switch $S_4$ when the electric current flowing into the coil 55 increases over a predetermined value, for example, over 50 A and to close the switch $S_4$ under a predetermined electric current, for example, 30A. The negative electrode terminal 53 which is contacted with the covering plate 2 is grounded.

In the fuel evaporator provided with two electrifying routes which are broken or connected with each other through the relay means R, before the engine is started, the coolant thermal switch $S_2$ is closed. The switch $S_4$ is also closed since the relay means R is not electrified.

When the ignition switch $S_1$ is closed to start the engine, electric current is applied from the battery B into the heating element 4a through the coil 55 of the relay means R. At the same time, electric current flowing through the coil 55 increases and the switch $S_4$ of the relay means R is opened. Therefore, the electric current is supplied only into the heating element 4a.

In only about three seconds after the heating element 4a is electrified, the temperature of the heating element 4a rises up to the Curie temperature thereof and the electric current flowing therethrough is suddenly lowered. Then, the switch $S_4$ of the relay means R is closed and the electric current also flows into the heating element 4b.

As described above, by providing a short time lag between the time when the ignition switch $S_1$ is closed and the time when both heating element 4a and 4b are electrified, a large amount of electric current is prevented from being consumed by the fuel evaporator at the engine cranking time so that the starting condition of the engine can be maintained good.

When the temperature of the cooling water rises up over 60° C. after the engine is started, the coolant thermal switch $S_2$ is opened to stop the operation of the fuel evaporator of the present invention.

The electrifying circuit as shown in FIG. 7 is provided with a time relay means by which the heating elements 4a and 4b start to be electrified at different times with each other with a predetermined time lag.

The negative electrode terminal 53 is grounded. The positive electrode terminal 52a of the heating element 4a is connected to the battery B through the coolant thermal switch $S_2$ and the ignition switch $S_1$.

The positive electrode terminal 52b of the heating element 4b is connected to the terminal 54a of the coolant thermal switch $S_2$ through the switch $S_4$ of the relay means R.

Between the terminal 54a and the terminal 53, a coil of the relay means R, a resistance 57 and a condensor 58 operating as a timer are connected in series. The relay means R operates to open the switch $S_4$ when the electric current flows into the coil 55.

Before the engine is started, the coolant thermal switch $S_2$ and the switch $S_4$ of the relay means R are closed.

By closing the ignition switch $S_1$ to start the engine, the electric current flows from the battery B to the heating element 4a through the terminal 52a and grounded through the covering plate 2 and the terminal 53. At this time, a small amount of electric current flows from the terminal 54a into the condensor 58 through the coil 55 of the relay means R and the resistance 57. And the switch $S_4$ of the relay means R is opened so that the heating element 4b is not electrified. And by charging the condensor with electricity after a predetermined time, for example three seconds, passed, the electric current does not flow into the coil 55 of the relay means R to close the switch $S_4$. As a result, the electric current starts to flow into the heating element 4b.

The electrifying circuits as shown in in FIG. 5, FIG. 6 and FIG. 7 can be also applied to the fuel evaporator wherein two electrodes are provided in one heating element as shown in FIG. 1.

In the above described embodiments, the electrifying routes are started to be electrified at different times with each other with a predetermined time lag. Therefore, there is a time lag of 1 to 3 seconds between the closing time of the ignition switch $S_1$ and the time when both electrifying routes are electrified. During these period, a large amount of electric current does not flow so that the cranking operation of the engine is facilitated and the starting condition of the engine can be maintained good.

And, when the temperature of the engine cooling water rises up to such a temperature as to evaporate the fuel droplets, the electric current is automatically stopped from flowing into the fuel evaporator or only the decreased electric current flows into the fuel evaporator. Therefore, the consumption of the electric power can be reduced.

As described above, in the fuel evaporator of the present invention, there is a time lag of 1 to 3 seconds between the closing time of the ignition switch $S_1$ and the time when the fuel evaporator fully operates.

However, the above described time lag is relatively instantaneous compared with the period which is needed for the conventional fuel evaporator to evaporate the fuel droplets.

Having now fully described the invention, it will be apparent to one of ordinary skill in the art that many changes and modifications can be made thereto without departing from the spirit or scope of the invention as set forth herein.

What is claimed is:

1. A fuel evaporator for use in a fuel entry system of an internal combustion engine comprising:
   a heating element which is made of ceramics and has a positive temperature coefficient of resistance, the resistance of said heating element suddenly increasing at a specific temperature;
   a covering plate which is made of a material having high thermal conductivity and covers said heating element to be contacted with fuel droplets falling within an intake gas supplying passage of said fuel entry system of said engine; and
   a connecting means for electrically connecting said heating element to an electric power source; said connecting means being composed of two electrifying routes and provided with a switching means which operates corresponding to the driving condition of said engine to connect said two electrifying routes in parallel or in series or break one of said two electrifying routes from said electric power source, selectively.

2. A fuel evaporator according to claim 1, wherein:
   two electrodes are formed in said heating element so as not to be contacted with each other; and
   said two electrodes are connected to said two electrifying routes, respectively.

3. A fuel evaporator according to claim 1, wherein:
   said heating element is composed of two sheets of heating elements which are not contacted with each other; and
   said two sheets of heating elements are connected to said two electrifying routes, respectively.

4. A fuel evaporator according to claim 1, wherein:
   said switching means is provided in one of said two electrifying routes;
   said switching means is composed of at least one out of a coolant thermal switch and an engine speed switch;
   said coolant thermal switch is disposed in an engine cooling water passage which is formed in said intake gas supplying passage to be closed at a temperature under a predetermined temperature of said cooling water and to be opened at a temperature above said predetermined temperature thereof; and
   said engine speed switch is connected to an engine speed detecting means to be opened when the engine speed is under a predetermined value and to be closed when the engine speed is over the predetermined value.

5. A fuel evaporator according to claim 4, wherein:
   said coolant thermal switch is opened at a temperature above 50° C. and below 70° C.; and
   said engine speed switch is closed when the engine speed is above a cranking speed of said engine.

6. A fuel evaporator according to claim 4, wherein:
   said switching means further comprises
   a relay means which operates to connect said two electrifying routes in parallel or in series corresponding to the opening and closing operation of said coolant thermal switch or said engine speed switch.

7. A fuel evaporator according to claim 4, wherein:
   said switching means further comprises
   a relay means which breaks one of said two electrifying routes when electric current applied into the other electrifying route is above a predetermined value, and connects said two electrifying routes in parallel when electric current applied into the other electrifying route is under a predetermined value.

8. A fuel evaporator according to claim 4, wherein:
   said switching means further comprising:
   a time relay means which breaks one of said two electrifying routes at an electrification starting time, and connects said two electrifying routes in parallel after a predetermined time passed thereafter.

9. A fuel evaporator according to claim 1, wherein:

said heating element is made of sintered ceramics containing semiconductive barium titanate as a main ingredient.

10. A fuel evaporator according to claim 1, wherein:
said covering plate is disposed in an opening which opens in a wall of said intake gas supplying passage so as to form one part of said wall; and
said heating element is joined to the reverse surface of said covering plate so as to transfer heat directly thereto.

* * * * *